United States Patent [19]
Ingram et al.

[11] 3,881,403
[45] May 6, 1975

[54] APPARATUS FOR MAKING BREAD AND LIKE FOOD PRODUCTS

[75] Inventors: Charles E. Ingram, Freeland; Roy H. Brunk, Saginaw; Edward Witkoske, Plymouth, all of Mich.

[73] Assignee: Baker Perkins Inc., Saginaw, Mich.

[22] Filed: Mar. 30, 1973

[21] Appl. No.: 346,642

[52] U.S. Cl. .................. 99/338; 99/352; 99/443 C; 219/10.55
[51] Int. Cl. ............................................ H05b 9/06
[58] Field of Search .......... 99/338, 337, 326, 443 C, 99/352; 219/10.55; 34/1, 4; 432/128, 133; 99/352

[56] References Cited
UNITED STATES PATENTS

| | | | |
|---|---|---|---|
| 982,665 | 1/1911 | Gantvoort | 432/133 |
| 1,420,102 | 6/1922 | Hilenbrant | 432/133 X |
| 2,584,584 | 2/1952 | Hoffman et al. | 99/443 C X |
| 3,440,383 | 4/1969 | Smith | 219/10.55 |
| 3,478,906 | 11/1969 | Jeppson | 219/10.55 |
| 3,630,755 | 12/1971 | Schlifmann et al. | 219/10.55 |
| 3,718,082 | 2/1973 | Lipoma | 219/10.55 |

*Primary Examiner*—Billy J. Wilhite
*Assistant Examiner*—Arthur O. Henderson
*Attorney, Agent, or Firm*—Learman & McCulloch

[57] ABSTRACT

Apparatus for making bread and like food products including a proofer which subjects unproofed dough to microwave energy at the outset of a proofing cycle to rapidly raise the internal temperature of the dough to a dough proofing temperature and then thermally heats the dough in a proofing atmosphere to completely proof the dough; apparatus for subjecting the proofed dough to microwave energy to cook the proofed dough; and apparatus for browning the cooked bread.

3 Claims, 3 Drawing Figures

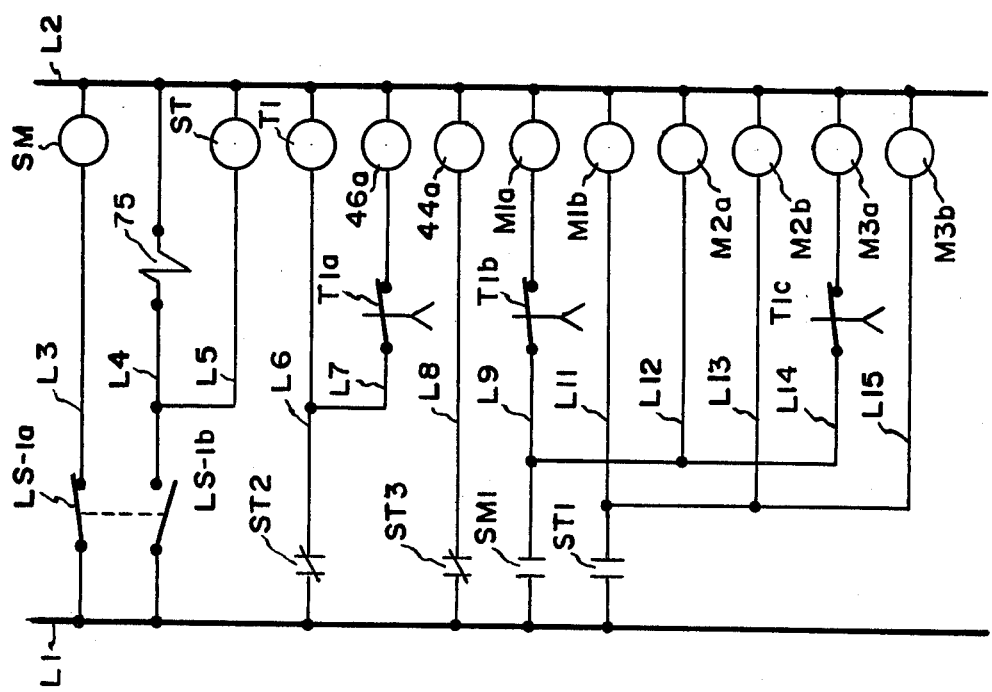

APPARATUS FOR MAKING BREAD AND LIKE FOOD PRODUCTS

BACKGROUND OF THE INVENTION

This invention relates to apparatus for making bread and like food products and more particularly to a bread making system including apparatus for proofing and cooking dough products utilizing microwave energy.

Conventional bread baking systems include proofers which subject dough to be proofed to an environment having a temperature of 120° to 125° F. and an 80 to 85 percent relative humidity for approximately 60 minutes to bring the temperature of the center of a dough loaf to 110°F. Although the dough surface is relatively quickly raised to the proper proofing temperature, substantial time is required before the heat transferred will raise the center of the loaf to the proofing temperature. Conventional bread making systems thus require substantial proof times. Accordingly, it is an object of the present invention to provide bread making apparatus which will substantially reduce the bread making time.

A further object of the present invention is to provide apparatus for making bread which will subject unproofed dough to microwave energy at the outset of the proofing cycle to rapidly raise the internal temperature of the dough.

Another object of the present invention is to provide apparatus for making bread by cooking the proofed dough with microwave energy after it has been proofed.

When the dough is being transferred to and from the microwave cooking or proofing sections in a bread making system of the character described, it is important that the supply of microwave energy to these sections be interrupted to prevent inadvertent heating and irradiating of persons and things external to the baking system. Since the microwave proofing and cooking is interrupted during the transfer of products to and from the cooking chamber, it is important, for the sake of efficiency, that the dough products be transferred between the proofing and baking sections as rapidly as possible. When the dough products are being subjected to microwave energy, it has been found that proofing and cooking is most effectively accomplished by continually moving the dough product. Accordingly, it is a further object of the present invention to provide apparatus of the type described including a conveyor system for rapidly transferring dough products to and from the microwave energy proofing and cooking sections of the bread making system, shielding gates for preventing the escape of microwave energy from the microwave proofing and cooking sections operating in timed relation with the operation of the conveyor system to permit the transfer of dough product by the conveyor system to and from the proofing and cooking sections, and apparatus for interrupting the introduction of microwave energy when the shielding gates are open.

It is another object of the present invention to provide a baking system including a microwave preheating and proofing chamber for receiving and partially proofing unproofed dough product, a conventional proofing chamber for receiving the dough from the preheating chamber for completely proofing the dough, a microwave dough cooking chamber for cooking the proofed dough product, and a conventionally heated browning zone for browning the bread after it has been cooked.

Other objects and advantages of the present invention will become apparent to those of ordinary skill in the art as the description thereof proceeds.

SUMMARY OF THE INVENTION

Apparatus for making bread and like food products comprising: proofing means for proofing dough, cooking means for receiving proofed dough product and cooking it, conveying means for conveying the unproofed dough to and through said proofing means and for conveying the proofed dough from the proofing means to and through the cooking means, the proofing means including a proofing chamber having a supply end and a discharge end through which the unproofed dough is received and proofed dough is discharged, respectively, means at the supply end of the proofing means for introducing microwave energy into the proofing chamber to rapidly raise the internal temperature of the unproofed dough to proofing temperature, and means for thermally heating the dough to completely proof the dough before it is moved through the discharge end, means for introducing microwave energy to the cooking chamber to rapidly raise the internal temperature of the proofed dough bread product to cooking temperature, and means for baking the cooked bread in a browning chamber to brown the cooked bread.

The present invention may more readily be described by reference to the accompanying drawings, in which:

FIG. 2 is a diagram of an electrical control circuit for operating the apparatus illustrated in FIG. 1; and FIG. 3 is a diagram schematically illustrating the dough product processing sequence.

DESCRIPTION OF THE PREFERRED EMBODIMENT

Figure 1:
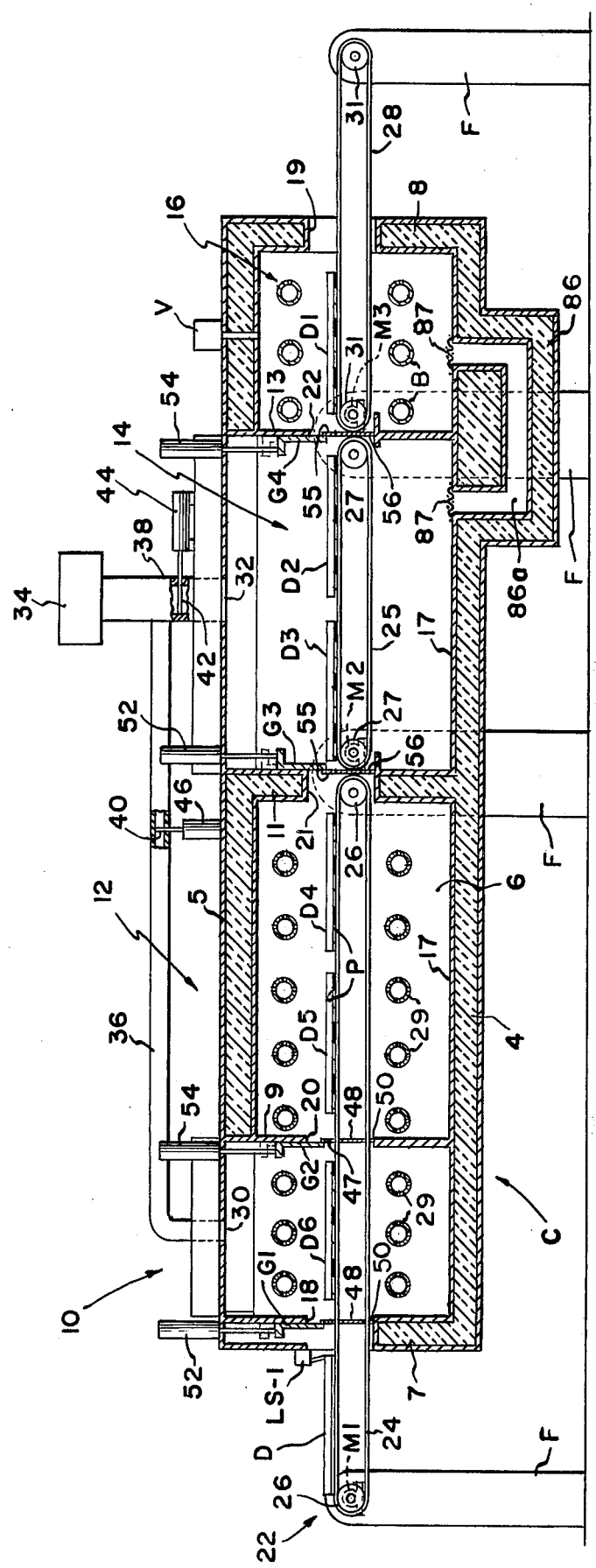
FIG. 1 is a sectional side view of bread making apparatus constructed according to the present invention.

Apparatus constructed according to the present invention is mounted on a frame, generally designated F, and includes a bread making, tunnel-type chamber, generally designated C, including top and bottom walls 4 and 5, spanned by side walls 6. A plurality of vertical end walls 7 and 8 and intermediate partitioning walls 9, 11, and 13 divide the chamber C into a preheat and proof chamber or zone, generally designated 10, a second proofing chamber or zone, generally designated 12, a cooking chamber or zone, generally designated 14, and a browning chamber or zone, generally designated 16. The top and bottom walls 4 and 5, side walls 6, end walls 7 and 8, and the partitioning wall 11 are constructed of relatively thick, heat insulating material lined with a thin metallic reflecting sheet 17. The intermediate partitioning walls 9 and 13 may simply comprise relfecting metal plates.

The end walls 7 and 8 and partitioning walls 9, 11 and 13 are provided with openings 18, 19, 20, 21, and 22, respectively, receiving a conveyor system, generally designated 22, which moves conventional bread or bun dough products D in a forward path of travel through the zones 10, 12, 14 and 16. The conveyor system 22 includes a first endless conveyor belt 24, extending through wall openings 18, 20 and 21 and trained around a pair of rolls 26 journaled on the frame F, for supplying dough products, generally designated D, to, and moving them through, the preheat and proof zone 10 and the final proofing zone 12. The conveyor system 22 includes a second endless conveyor belt 25, in the cooking zone 14, trained around a pair of rolls 27, journaled on the frame F, for receiving the proofed dough products D from the first conveyor belt 24 and conveying them through the cooking zone 14. The dough products may each comprise conventional bread dough or bun dough products, having a typical weight of 1 pound and 2¼ ounces, respectively, supported by pans P of synthetic plastic, such as "TEFLON" (polytetrafluoroethylene), which can withstand temperatures in the range of 450°–550° F. for at least 8 minutes. The conveyor system 22 includes a third endless conveyor belt 28, trained around a pair of rolls 31, journaled on the frame F (FIG. 1), receiving the dough products D from the second conveyor belt 25, moving them through the browning zone 16, and then discharging the browned product. One roll of each set of rolls 26, 27 and 31, is driven by the two-speed electric motors M1, M2, and M3, respectively (FIG. 1). The motors M1, M2, and M3 have low speed windings and high speed windings designated (in FIG. 2) by the reference character M1, M2, and M3 followed by $a$ and $b$ subscripts, respectively.

The side walls 6 of the proofing sections 10 and 12 include steam emitting nozzles 29 which are connected to a source of steam which will maintain the atmosphere in the zones 10 and 12 at a relative humidity of 85 percent, and at a temperature of 125° F. The nozzles 29 in zone 10 are covered by microwave energy shielding screens having apertures with a diameter less than the wave length of the microwave energy.

The upper wall 5 of the tunnel chamber C includes openings 30 and 32 in the zones 10 and 14 communicating with a source 34 of microwave energy via hollow metal conduits 36 and 38. The source 34 of microwave energy may suitably comprise a magnitron tube which emits evenly distributed microwaves having a frequency of 915 or 2,415 megahertz, for example. The metallic lining elements 17 in the microwave zones 10 and 14 reflect the microwave energy toward the dough product D.

To selectively interrupt the supply of microwave energy from the source 34 to the zones 10 and 14, gates 40 and 42 may be provided in the conduits 36 and 38, respectively. The gate 42 is normally retracted to the removed position, permitting microwave energy to be introduced to the zone 14, by a solenoid actuated, spring returned, fluid operated cylinder 44. When a normally energized control solenoid 47$a$ (line L8-FIG. 2) is deenergized, the gate 42 is moved to blocking position. The microwave blocking gate 40 is normally in the microwave blocking position, but is movable to the retracted position by a solenoid actuated, spring returned fluid operated cylinder 46.

Provided at opposite ends of the preheat and proof chamber 10 are a pair of microwave energy blocking gates G1 and G2 which move between remote, inoperative positions, illustrated in chain lines in FIG. 1, and operative, microwave energy blocking positions (illustrated in solid lines in FIG. 1) engaging the conveyor belt 24 covering the openings 18 and 20 to prevent the escape of microwave energy therethrough. The gates G1 and G2 include conveyor engaging portions 47, such as tinfoil aprons, which drape on the upper run of the conveyor belt 24. Wall supported tinfoil covered sections 48 and 50 span the upper and lower runs of the conveyor belt 24 and engage the lower run of the conveyor 24 at the openings 18 and 20 to completely close the apertures 18 and 20 and prevent the escape of microwave energy when the gates G1 and G2 are closed. Solenoid actuated, spring returned, fluid operated cylinders 52 and 54 are mounted on the upper chamber wall 5 for moving the gates G1 and G2 to the raised positions.

A pair of microwave energy blocking gates G3 and G4 are mounted on the partitioning walls 11 and 13 for vertical movement between the raised positions, illustrated in chain lines, and blocking positions, illustrated in solid lines, to prevent the escape of microwave energy through the openings 21 and 22 at opposite ends of the microwave cooking zone 14. Double acting, solenoid actuated, fluid operated cylinders 52 and 54 are mounted on the upper wall 5 and move the gates G3 and G4 between the raised and lowered positions. The gates G3 and G4 include terminal tinfoil covered shield portions 55 for engaging upstanding foil-covered sections 56 extending upwardly between the conveyors 24 and 25, and the conveyors 25 and 28 to prevent the escape of microwave energy from the section 14. The gates G1 through G4 may suitably comprise sheets of metal or metallic screens having apertures with a diameter less than the microwave wave length.

It should be understood that the microwave energy blocking gates G1, G2, G3, G4, 40 and 42 could be electronic chokes rather than mechanical gates. An insulated conduit 86 for continuously circulating heated atmosphere from the browning section 16 to the microwave cooking section 14 may be provided and includes a passage 86$a$ communicating with the zones 16 and 14 to permit the atmosphere in zone 16 to pass to zone 14 so that some browning can occur in zone 14 during the "cook". A metallic screen 87 covers the passage 86$a$ to prevent microwave energy from escaping cooking chamber 14 via duct 86. A vacuum source V communicates with the browning zone 16 to maintain it under a slight vacuum and thereby prevent the escape of heated air. Gas burners B are provided in browning zone 16 to maintain it at a temperature of 450°–550° F.

THE CONTROL CIRCUIT

The control circuit for controlling the operation of the bread making system is schematically illustrated in FIG. 2 and includes a pair of lines L1 and L2 connected across a suitable source of power such as 110 volt, 60 hertz alternating current. Connected across the lines L1 and L2 is a line L3, including a normally closed set of limit switch contacts LS-1$a$, which are opened when a limit switch LS-1, at the inlet 18 of the preheat and proof chamber 10 is tripped by dough products D being supplied. The line L3 also includes a low speed control relay SM which, when energized, closes a set of normally open relay contacts SM1 (line L9). The limit switch LS-1 is actuated each time a bakery product D approaches the preproofer inlet 18. Connected in circuit line L4, across the lines L1 and L2, are the normally open limit switch contacts LS-1$b$, which are closed when the limit switch LS-1 is tripped, and a gate-opening solenoid 75 which, when actuated, causes fluid to be directed to the gate opening cylinders 52 and 54 in such a direction as to move the microwave interrupting gates G1, G2, G3 and G4 to the raised, inoperative positions permitting dough products D, upstream of the gates G1–G4, to be moved through the openings 18, 19, 20 and 21. Connected in parallel with the microwave gate opening solenoid 75 is a circuit line L5 including a high speed transfer relay ST which includes a set of normally open contacts ST1 (line L11) and normally closed contacts ST2 (line L6) and ST3 (line L8) which are closed and opened, respectively, when the high speed transfer relay ST is energized. Connected in circuit line L6, across the lines L1 and L2, are the normally closed, low speed relay contacts ST2 of low speed relay ST (line L5), and a timer T1 which includes sets of normally closed timer contacts T1$a$ (line L7) and T1$b$ (line L9) that open as the timer T1 times out. Connected in parallel with the timer T1 is a line L7, including the normally closed timer contacts T1$a$ and a microwave control relay 46$a$ which, when energized, operates cylinder 46 to retract the microwave energy supply gate 40 and permit microwave energy to be supplied to preproof section 10.

Connected in line L8, across the lines L1 and L2, are the normally closed, high speed transfer relay contacts ST3 which open when the relay ST (line L5) is energized and a solenoid 44$a$ which, when energized, causes fluid to be directed to the microwave energy control cylinder 44 in such a manner as to withdraw the microwave energy supply gate 42 from the position blocking the supply of microwave energy to cooking zone 14.

Connected in lin L9, across the lines L1 and L2, is a set of relay contacts SM1 which close when the slow speed relay SM (line L3) is energized, the normally closed timer contacts T1$b$, which open as the timer T1 times out, and the slow speed winding M1$a$ for driving the conveyor belt 24 at a first predetermined slow speed, for example, 0.375 feet per minute. Connected in parallel with the timer contacts T1$b$ and motor winding M1$a$, are circuit lines L12 and L14. Line L12 includes a slow speed winding M2$a$ for driving the motor M2 in such a manner as to move the second conveyor belt 25 at the same low speed. Line L14 includes the set of timer contacts T1$c$, which open when the timer T1 times out, and a slow speed winding M3$a$ for selectively driving the motor M3 at the same low speed.

Connected in line L11 is a set of normally open contacts ST1 which close when the high speed transfer relay ST (line L5) is energized, and the high speed winding M1$b$ of the motor M1 which is operative to drive the first conveyor belt 24 at a substantially higher speed, for example, 10 feet per minute. Connected in parallel with the winding M1$b$ are lines L13 and L15. Line L13 includes the high speed armature winding M2$b$ of the motor M2 for driving the second conveyor 25 at the same high speed. Connected in line L15 is a high speed armature winding M3$b$ which drives the motor M3 at a speed to drive the third conveyor belt 28 at the same high speed as the first and second conveyor belts 24 and 25, so that products may be smoothly transferred therebetween.

THE OPERATION

The loaves of dough product, schematically designated D1 through D6 in FIG. 3, and preheated to 85°–90° F., are successively delivered to the gate G1 at 7-minute intervals. Only the typical processing sequence of loaf D1 will be discussed, it being understood that the loaves D2–D6 will be similarly processed as they pass through the system. At cycle start, the first loaf D1 of unproofed dough D is supplied to the inlet gate G1 of the preheat and proof chamber 10, the limit switch LS-1 is tripped to close the limit switch contacts LS-1$b$ (line L4) and energize the microwave gate opening solenoid 75 which causes the microwave energy blocking gates G1 through G4 to be opened. At the same time, the high speed transfer relay ST (line L5) is energized to close the relay contacts ST1 (line L11) and concurrently energize the high speed transfer windings M1$b$, M2$b$ and M3$b$ of the motors M1, M2 and M3, respectively, which drive the conveyors 24, 25 and 28 at the high speed of ten feet per minute to rapidly transfer the first loaf D1 into the preproof chamber 10. After 15 seconds from cycle start, the first loaf product D1 is within the preheat and proof chamber 10 and the limit switch LS-1 is deactuated so that the limit switch contacts LS-1$b$ (line L4) open to deenergize the microwave gate opening solenoid 75 and the microwave energy blocking gates G1–G4 are spring returned to closed positions. The high speed transfer relay ST (line L5) is concurrently deenergized and the slow speed relay SM (line L3) is concurrently energized through the now closed contacts LS-1$a$ (line L3). This closes the contacts SM1 (line L9) to energize the slow speed windings M1$a$, M2$a$ and M3$a$ of the motors M1, M2 and M3 which drive the conveyor belts 24, 25, and 28 at the substantially reduced speed of 0.375 feet per minute. When the limit switch LS-1 is deactuated, the relay ST (line L5) is deenergized and the contacts ST2 (line L6), are closed. This energizes the microwave supply relay 46$a$ which operates to open the gate 40 and permit microwave energy to be introduced to the preheat and proof zone 10. The internal temperature of the loaf D1 is rapidly brought to proofing temperature (91°–96° F.) in a relatively short time, i.e., 30 seconds. After this, the timer T1 (line L5), which was reset when the limit contacts ST2 closed, times out to open the timer contacts T1$a$ (line L7) and deenergize the microwave energy control solenoid 46$a$ which interrupts the supply of microwave energy to the preheat and proof zone 10. At this same time the timer contacts T1$b$ (line L9) and T1$c$ (line L14) open to interrupt the first and third conveyors 24 and 28. The product D1 is then subjected to 6 minutes and 15 seconds of conventional proof atmosphere having a relative humidity of approximately 85 percent and a temperature of 125°F., controlled by the heat and steam injected through the supply jets 29.

After 7 minutes has elapsed from cycle start, the loaf D1 is partially proofed and the second loaf of dough D2 arrives at the supply gate G1 to trip the limit switch LS-1 which opens the limit switch contacts LS-1$a$ (line L3) and closes the limit switch contacts LS-1$b$ (line L4) so that the gates G1–G4 are concurrently opened for 15 seconds to permit the loaf D1 to be moved to the second proof zone 12 and the loaf D2 to be moved to the preheat zone 10 by conveyor 24 which is being driven at the high rate of speed by the now energized winding M1$b$. During high speed transfer, the contacts ST2 (line L6) and ST3 (line L8) are opened by the now energized high speed transfer relay ST (line L5) so that the microwave supply relay 44$a$ (line L8) interrupts the supply of microwave energy to the proofing zone 10 and the cooking zone 14. After a total elapsed time of 7 minutes and 15 seconds, the limit switch LS-1 is deactuated to close the limit switch contacts LS-1$a$ (line L3) and energize the relay SM (line L3), which closes contacts SM1 (line L9) to energize the slow speed windings M1$a$, M2$a$, and M3$a$ to drive the conveyor belts 24, 25, and 28 at the reduced speed. The microwave blocking gates G1–G4 are then spring returned to the closed positions as the contacts LS-1*b* (line L4) again open to deenergize the gate control solenoid 75 (line L4). The relay ST (line L5) is concurrently deenergized to again close the contacts ST2 (line L6) and ST3 (Line L8) and energize the microwave energy supply relays 46*a* and 44*a* opening the gates 40 and 42 so that microwave energy is again supplied to zones 10 and 14. The product D1 is subjected to a proofing atmosphere having a relative humidity of 85 percent and a temperature of 125° F. in proofing zone 12. At the end of another thirty second period, or a total elapsed time of 7 minutes and 45 seconds from cycle start, the timer T1, which was reset when the limit switch LS-1 was deactuated, again times out and opens the contacts T1*a* (line L7) to deenergize the microwave supply relay 46*a*, which interrupts the supply of microwave energy to the preheat and proof zone 10. The contacts T1*b* (line L9) and T1*c* (line L14) concurrently open to interrupt the conveyors 24 and 28. The products D1 and D2 are then both subjected to the aforementioned conventionally heated, proofing environment for an additional six minutes and 15 seconds in zones 10 and 12, respectively.

At the end of this period, a total of 14 minutes has elapsed and the third unproofed dough product D3 is delivered to trip the limit switch LS-1 and cause the control system to again repeat its cycle. The gates G1–G4 open and conveyors 24, 25, and 28 will be driven at the high rate of speed for 15 seconds to rapidly transfer the first loaf product D1 to the second half of the proofer section 12, the second loaf D2 to the first half of the proofing section 12, and the third unproofed product D3 to the preheat and proof zone 10.

The gates G1–G4 again close and microwave energy is again introduced to the zones 10 and 14 through the now opened gates 40 and 42. The product D1 and D2 are subjected to the aforementioned conventional proofing environment for 6 minutes and 45 seconds while the product D3 is subjected to 30 seconds of microwave energy and the 6 minutes and 15 seconds of conventional proof. The product D1 is thus subjected to a conventional thermal proof atmosphere for a total of only 20 minutes and 15 seconds which is substantially shorter than conventional proofing time. The rapid internal temperature increase in the product D1 at the beginning of the proofing cycle thus substantially decreases the proof time and yet results in a product of acceptable and comparable quality. The product D1 achieves about 80 percent of its final volume when proofed.

After a total elapsed time of 21 minutes, the unproofed dough product D4 is delivered and the high speed transfer relay ST (line L5) is again energized to drive the conveyors 24, 25 and 28 at the high rate of speed for 15 seconds and transfer the completely proofed product D1, having an exit temperature of 110° F. at its center, to the microwave cooking section 14. The product D2 is transferred to the second half of the proofer section 12, the product D3 to the first half of proofer chamber 12, and the fourth loaf of unproofed dough D4 is transferred to the proof chamber 10.

As soon as the first dough product D1 is transferred to the microwave cooking section 14, the limit switch LS-1 is deactuated to open limit switch contacts LS-1*b* (line L4) and deenergize the gate control solenoid 75 which closes the microwave control gates G1–G4. At this same time, the high speed transfer relay ST (line L5) is deenergized to close the relay contacts ST2 (line L6) and ST3 (line L8) which energizes the microwave supply relays 46*a* and 44*a* respectively, causing microwave energy to be supplied to the microwave cooking section 14 as well as chamber 10. Thirty seconds after the products D1–D4 are transferred, the timer T1 again times out to open contacts T1*b* (line L9) and T1*c* (line L14) and interrupt the conveyors 24 and 28. Contacts T1*a* (line L7) are also opened to interrupt the supply of microwave energy to the preheat and proof zone 10. Microwave energy is continually supplied to the cooking zone 14 and the second conveyor 25 continues to operate at the slow speed to "mix" the microwave energy within the cooking chamber 14. During the first portion of the cooking cycle, the loaves reach an internal temperature of 145° F., above the thermal death point of the yeast (125°–140° F.), so that yeast action is completed and the loaf reaches its final volume.

As the fifth unproofed dough product D5 is delivered at the 28 minute mark, the control system again repeats it cycle to transfer the cooked dough product D1 to the browning zone 16 in 15 seconds at the high rate of speed. The gates G1–G4 again close and the loaf D1 is subjected to an atmosphere having a temperature between 450° to 500° F. for 6 minutes and 45 seconds to heat the center of the loaf to an exit temperature greater than 200° F. Upon exit, the outside of the loaf is brown in color to present the appearance of a conventionally baked loaf of bread.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A baking system including:
   a proofing chamber for proofing dough product;
   a cooking chamber for cooking proofed dough product;
   conveyor means for successively receiving and conveying dough product through said proofing chamber and moving proofed dough product from said proofing chamber through said cooking chamber;
   means for introducing microwave energy into said proofing chamber and said cooking chamber;
   microwave shield means in said proofing chamber and said cooking chamber selectively operable to prevent the escape of microwave energy from said chambers;
   means for operating said conveyor means at a predetermined speed to move dough to said proofing chamber, transfer proofed dough product from said proofing chamber to said cooking chamber, and remove cooked product from said cooking chamber;
   means for interrupting the operation of said microwave energy introducing means when product is transferred to and from said chambers; and
   means for operating said microwave shield means in timed relation with the operation of said conveyor means and said microwave energy introducing means to render said microwave shield means inoperative and permit dough product to move to and from said chambers when said conveyor means are operating to transfer products to and from said chambers, but preventing the escape of said microwave energy when said microwave energy introducing means is operating;

said proofing chamber including:

a first proofing chamber section having an inlet and an outlet;

and a second proofing chamber section having an inlet and an outlet;

said cooking chamber having an inlet and an outlet;

said conveyor means including:

first conveyor means for successively receiving dough product at the inlet of said first proofing chamber section and conveying it through said first and second proofing chamber sections and discharging the proofed dough product at the outlet of said second proofing chamber section; and second conveyor means for receiving the proofed dough product from said first conveyor means and moving it from the inlet of said cooking chamber section to the outlet of said cooking chamber section; and means is provided for introducing microwave energy into said first proofing chamber section and said cooking chamber;

said microwave shield means being movable between removed positions and shielding positions covering the inlets and outlets of said first proofing chamber section and said cooking chamber to prevent the escape of microwave energy;

means is provided for operating said first and second conveyor means at a predetermined speed to move dough from the inlet toward the outlet of said first proofing chamber section, transfer partially proofed dough from said first proofing chamber section to said second proofing chamber section, transfer proofed dough from said second proofing chamber section to said cooking chamber, and remove the cooked product from said cooking chamber;

means is provided for moving said microwave shield means between said shielding and removed positions in timed relation with the operation of said conveyor means to permit dough product to move through said inlets and outlets when said conveyor means are operating at said predetermined speeds, but covering said inlets and outlets when said conveyors are not operating at said predetermined speeds; and means is provided for preventing operation of said microwave means when said shield means are in said removed positions.

2. The system of claim 1 including:

means for operating said first and second conveyor means at a slower predetermined speed after the product is transferred to said first proofing chamber and while said microwave energy introducing means is operating.

3. The system set forth in claim 2 wherein means is provided for interrupting the introduction of microwave energy to said first proofing chamber while continuing the introduction of microwave energy to said cooking chamber; and means is provided for interrupting the operation of said first conveyor means but continuing the operation of said second conveyor means at said slower predetermined speed while microwave energy in being introduced to said cooking chamber.

* * * * *